United States Patent [19]
Midgdey et al.

[11] Patent Number: 5,485,606
[45] Date of Patent: Jan. 16, 1996

[54] SYSTEM AND METHOD FOR STORING AND RETRIEVING FILES FOR ARCHIVAL PURPOSES

[75] Inventors: Christopher W. Midgdey, Ypsilanti; Richard S. Hunsche; Mark L. Weaver, both of Ann Arbor, all of Mich.

[73] Assignee: Conner Peripherals, Inc., San Jose, Calif.

[21] Appl. No.: 905,083

[22] Filed: Jun. 24, 1992

Related U.S. Application Data

[63] Continuation of Ser. No. 377,729, Jul. 10, 1989, abandoned.
[51] Int. Cl.⁶ .................................................. G06F 15/20
[52] U.S. Cl. .......................... 395/600; 395/500; 364/264; 364/267; 364/282.3; 364/283.3; 364/DIG. 1
[58] Field of Search .................................... 395/650, 700, 395/500, 600

[56] References Cited

U.S. PATENT DOCUMENTS

| | | | |
|---|---|---|---|
| 4,530,052 | 7/1985 | King et al. | 364/200 |
| 4,607,346 | 8/1986 | Hill | 364/900 |
| 4,825,354 | 4/1989 | Agrawal et al. | 395/600 |
| 4,862,349 | 8/1989 | Foreman et al. | 364/200 |
| 5,012,407 | 4/1991 | Finn | 364/200 |
| 5,297,124 | 3/1994 | Plotkin et al. | 395/500 |
| 5,339,435 | 8/1994 | Lubkin et al. | 395/700 |
| 5,355,497 | 10/1994 | Cohen-Levy | 395/700 |

*Primary Examiner*—Kevin A. Kriess
*Assistant Examiner*—John Q. Chavis
*Attorney, Agent, or Firm*—Fliesler, Dubb, Meyer & Lovejoy

[57] ABSTRACT

A system and method for backing-up, or storing, user-created files to a magnetic tape, or the like, and for subsequently retrieving, or restoring, selected files. Files that are backed-up utilizing one particular operating system software may be restored by a computer system utilizing a different operating system software to provide forward and backward compatibility. A directory file is created for each user file and is written to the tape. Information specific to the manner in which an operating system treats a file is stored in a first field area of the directory file and information non-specific, or common, to all operating systems is stored in a second field area of the directory file. The operating system of the computer system that backed up a file or set of files is identified on the tape and is compared, during file restoration, with the operating system of the restoring computer system to determine if the operating systems are the same or different. If the same, then all portions of the directory file are retrieved for combining with the file data information to restore the file. If different, then only the non-specific information in the common field area is retrieved and used in file restoring. Additionally, enhanced reliability is provided by storing data information from the user-created file in a different area of the tape in a data file having a header containing sufficient information to allow reconstruction of the directory file if destroyed or accidentally erased.

33 Claims, 7 Drawing Sheets

DIRECTORY FILE —28a

COMMON FIELDS AREA: —48

OFFSET IN BACKUP SET —42

LAST CHANGE DATE (UNIX FORMAT) —43

SIZE OF DATA FILE —44

ATTRIBUTE WORD —45

SPLIT FILE
        INCOMPLETE FILE
        HIDDEN FILE

NAME AREA: —46

(VARIED-LENGTH STRING, NULL-TERMINATED)

OPERATING SYSTEM SPECIFIC FIELDS AREA: —49

(NUMBER OF FIELDS, TYPE, AND OFFSET
    ARE OPERATING SYSTEM SPECIFIC)

*FIG. 3*

DATA FILE —30a

HEADER —50

SIGNATURE STRING —52
    HEADER LENGTH —53
    OPERATING SYSTEM —55
    HEADER VERSION NUMBER —60
    BACKUP SET ID NUMBER —59
    ATTRIBUTE WORD —56
    OFFSET INTO SPLIT FILE —64
    FILE SIZE —57
    FILE DATE (UNIX FORMAT) —58
    OFFSET OF PATH FROM BEGINNING OF HEADER —63
    OPERATING SYSTEM SPECIFIC FIELDS —62
    FULL PATH AND NAME OF FILE —61

DATA INFORMATION (MOTOROLA BYTE-ORDERING) —54

*FIG. 4*

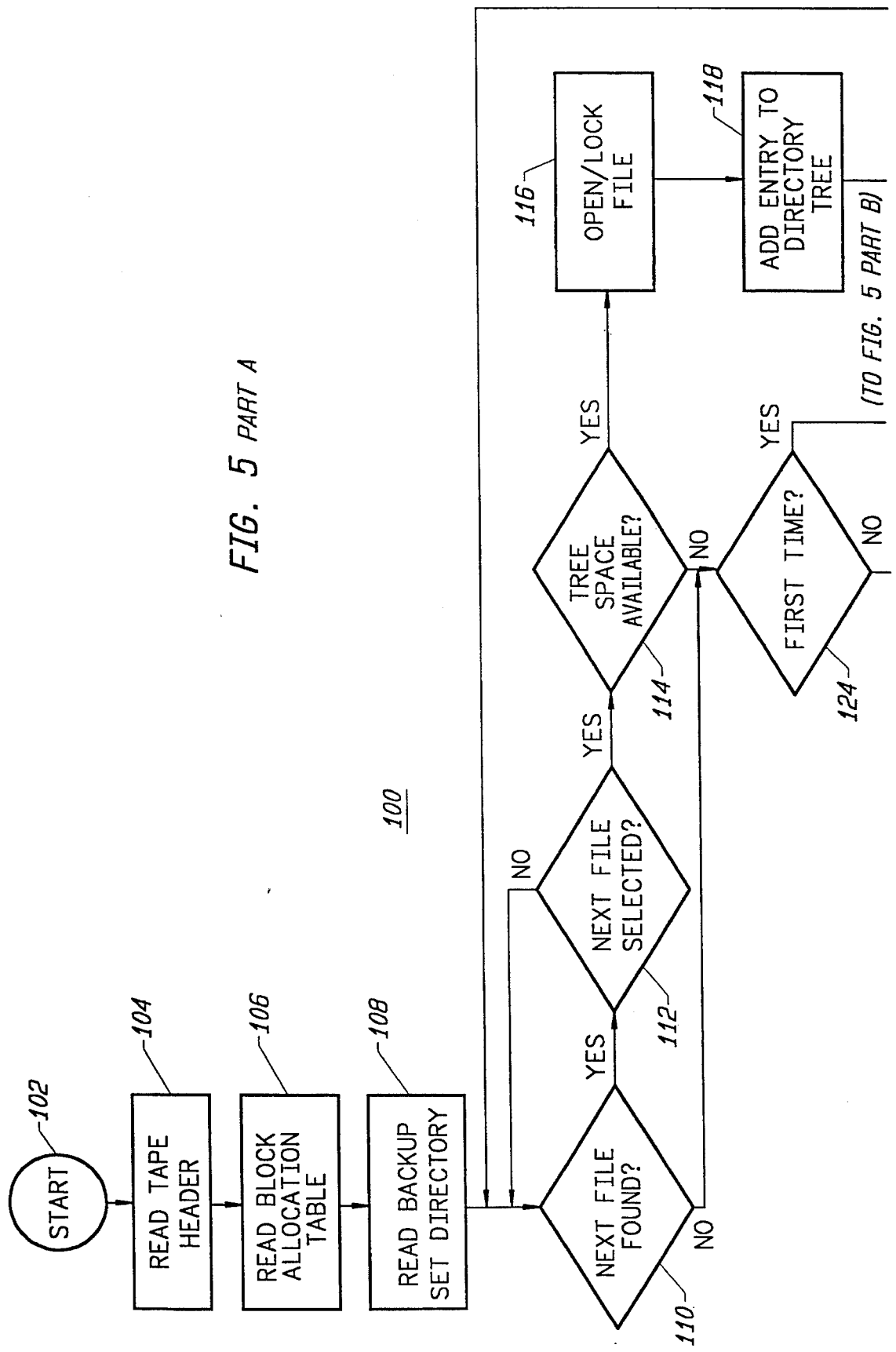
FIG. 5 PART A

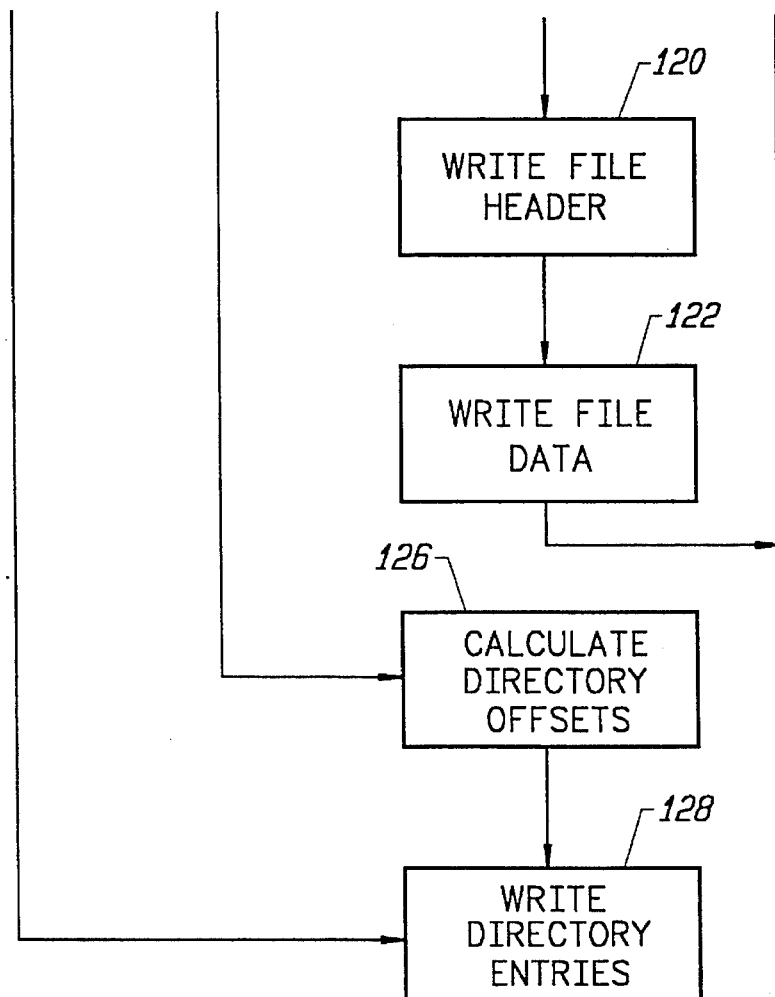
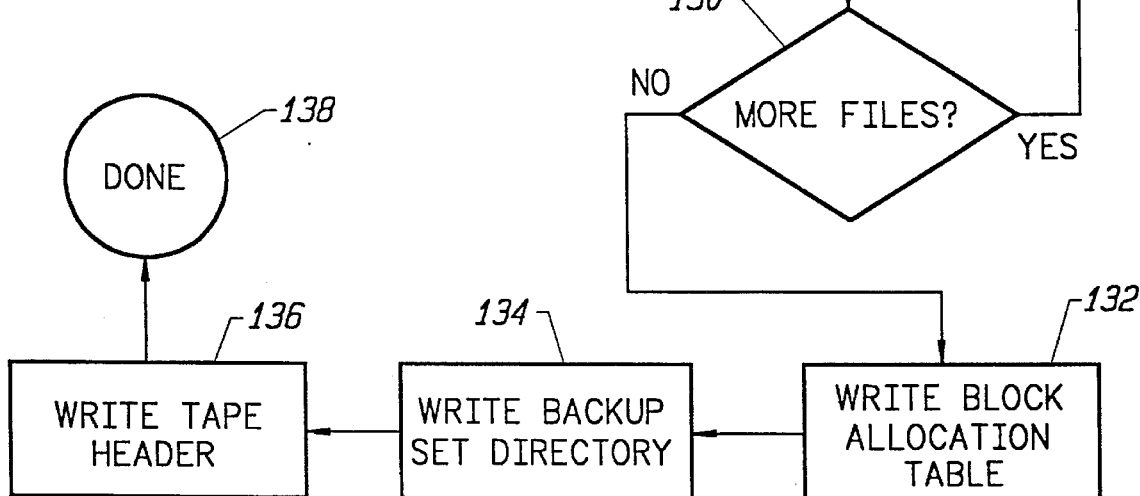
FIG. 5 PART B

SYSTEM AND METHOD FOR STORING AND RETRIEVING FILES FOR ARCHIVAL PURPOSES

This is a continuation of application Ser. No. 07/377,729 filed on Jul. 10, 1989, now abandoned.

BACKGROUND OF THE INVENTION

The present invention relates to systems and methods for storing computer files on magnetic medium or the like and in particular to such systems and methods for storing a potentially large number of such files for archival purposes.

A wide variety of storage devices has been developed for storing digital data or information generated by and utilized in conjunction with, a digital computer. The selection of an appropriate storage device for a particular application is dictated by several factors including the cost per byte of information stored and the read/write response time. CMOS random access memories (RAM) provides the fastest response time, but has the highest cost per byte. At the other end of the spectrum, magnetic tape has the slowest response time, but the lowest cost per byte stored. This cost factor makes magnetic tape the preferred medium for archiving data files for long term storage.

Information processed by a computer is organized into distinct units called files, each of which contains related data. In addition to the data, each file commonly contains descriptive information such as the title of the file and the date of its creation or last revision. Additionally, each file contains control information specific to the operating system software with which the file is created that establishes the manner in which the operating system software processes the data. By way of example, MS DOS operating system software, which is commercially available, creates specific information used to determine if a file belongs to the system or the user. Macintosh operation system software provides information words related to Icons, colors, fonts and the like, all of which pertain to graphic display control. Unix operating system software includes specific information identifying the file type and the permissive user access to the file.

Although the file data is typically available in standard formats common to the major commercially available operating systems, the remaining information related to a file typically cannot be processed by an operating system different from that which creates the file. Not only is certain control information, which performs specific control functions, not functional with different operating systems, the format of the file name often varies in size and makeup for different operating systems. The result, is that a file created and stored on a medium by one operating system can only be read, or restored, by a computer using substantially the same operating system. While emulators have been developed that provide adaptations between different operating systems, known emulators are specific to the operating systems being adapted from and the operating system being adapted to. Whenever it is desired to include another operating system in the emulator, all prior versions must be reissued to support the new operating system.

Another difficulty with conventional systems and methods for storing files for archival purposes is the batch processing of files to storage. Thus, once archived, individual files cannot be identified and restored separate from the batch of files, which must be restored as a batch. While systems have been proposed that include a directory of individual files stored in a medium, such that a review of the files on the medium and selective restoration of individual files is available, destruction of the directory results in the inability to retrieve the associated data files.

SUMMARY OF THE INVENTION

It is an object of the invention to provide a system and method for storing data files that provides for compatibility with virtually any operating system, including those not yet known, by providing restoring of files with operating system software different than that which wrote the file.

According to one aspect of the invention, user-created files, or user files, are stored or backed-up from a computer system utilizing a particular operating system on a storage medium by creating a directory file and a corresponding data file on the medium. The directory file includes information identifying the operating system of the storing computer system and a field in which information is stored that pertains to the user file and is nonspecific to the particular operating system of the storing computer system. The directory file additionally includes a field in which information is stored that pertains to the user file and is specific to the particular operating system of the storing computer system. In accordance with this aspect of the invention, the user-created file can be restored by a computer system utilizing a different operating system by retrieving only the data file and the portion of the directory file including information nonspecific to the particular operating system. If restored by a computer system utilizing the same or a compatible operating system, the data file and all portions of the directory file are retrieved.

According to another aspect of the invention, a file is restored from storage medium by examining the directory file to determine if the restoring operating system is substantially the same as, or is different from, the operating system identified in the directory file as the one with which the file was created. If the operating systems are substantially identical, then the entire file contents may be restored. If the operating systems are different, then the restoring system ignores information in the field in which information specific to the operating system is located. In addition to the data portion of the file, only information in the directory file fields in which information nonspecific to the operating system is stored, is retrieved. The retrieved nonspecific information is tested against the requirements of the restoring operating system and, if not fully compatible with the restoring operating system, then a conversion algorithm that will accomplish all conceivable conversions is applied to ensure compatability.

It is a further object of the invention to provide a system and method for storing files on a magnetic tape which provides the capability for displaying the files stored on the medium and restoring of selected individual files from the storage medium notwithstanding the destruction of the directory portion of the medium. In accordance with another aspect of the invention, for each file selected by a user for inclusion in a backup set, a data file and directory file is created. Each data file includes a header which is sufficient to provide restoring of the data file and reconstruction of the corresponding directory file if the directory file corresponding to the data file is destroyed. The directory file contains information indicating the location of the data file on the tape and a backup set directory file is created containing information indicating the location of the directory files for the backup set on the tape. The backup set directory allows the user to select files within the set to be restored by retrieving the directory files and data files for the selected files. During performance of the normal restoring function, the data file header is bypassed to retrieve the data. If, however, the corresponding directory file is destroyed, the header is retrieved to reconstruct a directory file for the data file. These and other related objects, advantages and features of this invention will become apparent upon review of the following specification in conjunction with the drawings.

BRIEF DESCRIPTION OF THE DRAWINGS

FIG. 3 illustrates the content of a directory file in the directory blocks;

FIG. 4 illustrates the content of a data file in the data blocks including a file header;

FIG. 5 is a flow chart of the backup function;

DETAILED DESCRIPTION OF THE PREFERRED EMBODIMENT

I. Tape Format

For the purpose of the following, a user,created file or user-file is a file established with a computer system and will be assumed to be stored on the system's hard disk, although it may be stored on a floppy disk or in random access memory. An operating system is software controlling fundamental interactions between portions or components of the computer hardware with which it is used. Information means bytes or words used in a computer system and is collectively applied to data, control and/or descriptive types of such information.

In the illustrated embodiment, the backup system of the present invention includes a multi-track magnetic tape capable of storing 80–120 megabytes of data information on a single data cartridge. The construction of the backup unit is generally well-known to those having ordinary skill in the art, for example as illustrated in U.S. Pat. Nos. 4,472,750; 4,468,712 and 4,647,994. Such data tape drives have been manufactured and sold by the assignee of the present application. The data cartridges are those sold as Models TC200 and TC400 by Irwin Magnetic Systems, Inc., of Ann Arbor, Mich. Although the invention is illustrated in a magnetic tape system, it is capable of implementation in other storage media, such as magnetic hard disks and optical disks.

Figures 1, 2:
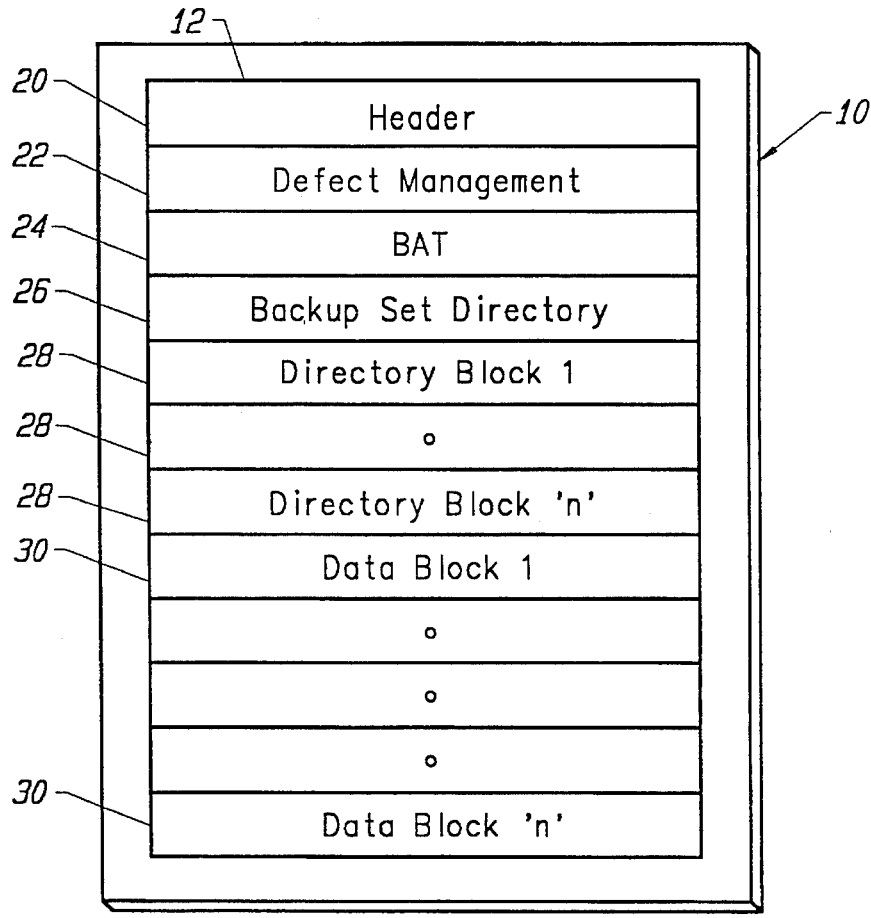
FIG. 1 illustrates the physical magnetic medium format of the backup blocks.
FIG. 2 illustrates the content of a file in the backup set directory.

The physical format of a storage medium 10 is illustrated in FIG. 1. Medium 10, which in the illustrated embodiment is a magnetic tape, is divided into units or blocks 12 having uniform pre-established size which, in the illustrated embodiment, is either 16 or 29 kilobytes per block. The blocks 12 are physically formatted beginning at the top of FIG. 1 and moving downwardly. However, information may be written to or retrieved from medium 10 by movement nonsequentially between blocks 12. In a preferred embodiment, blocks 12 are formatted in a serpentine-like fashion on the tracks of a multiple-track magnetic tape beginning at the leading portion of the tape to the end of the first track, then in a reverse direction along the second track, back to the beginning of the tape, and so forth.

The first block 12 is a tape header 20 which identifies the version of backup software (which is distinct from the operating system software of the computer system performing the backup function) as well as the date on which the last backup was performed. The next logical block is a defect management block 22 which controls the formatting to the medium 10 to avoid defective portions of the medium, as is well-known in the art.

The third and fourth logical blocks include a block allocation table (BAT) block 24 and a backup set directory block 26. For every set of user files selected by the user at one occurrence for backup (backup set), a file 26a (FIG. 2) is written in backup set directory 26. Files 26a are stacked in the backup set directory, i.e., subsequent backup set files are added to the stack and deleted backup set files are removed from the stack, with subsequent backup set files 26a being moved up in the stack. Each file 26a includes information pertinent to the backup set and pointers to relevant locations in the Block Allocation Table block. In addition, for each user file in each backup set, a directory file 28a (FIG. 3) is formatted and written in a directory block 28. More than one directory block 28 is typically assigned for medium 10 and the portion of medium 10 formatted for directory blocks may be as much as ten percent (10%). In addition, for each user file in each backup set, a data file 30a (FIG. 4) is formatted and written in one or more data blocks 30 or a portion thereof. Data blocks 30 occupy the majority of the medium 10. Thus, it is seen that, for every user file selected by the system user for inclusion in a backup set, a directory file 28a and a data file 30a are created and stored on tape 10. For every backup set of user files selected by the user, a backup set file 26a is created and stored on the tape in the backup set directory block 26.

Block allocation table 24 includes an array of memory locations, each of which corresponds to one block 12 of the tape. As the system stores directory files 28a in directory blocks 28 for a given backup set, the block or blocks in which the directory files are stored are written in block allocation table 24 and interconnected with the starting locations for the backup set with pointers in a chain-like fashion. Likewise, a data block chain is established in the block allocation table corresponding to the data blocks 30 in which the data files 30a are written for a given backup set. The starting locations for the directory block chain and the data block chain are addressed by pointers from the backup set directory file 26a for the corresponding backup set.

Each backup set directory file 26a includes a field 32, that is null-terminated, for a user-assigned backup set name (FIG. 2). Field 32 is followed by a date and time field 33 in which the backup software stores the date and time that the backup set was created or last modified. File 26a further includes user-assigned password field 34 and set description field 35, both of which are null-terminated fields. File 26a further includes a field 36 for storing a designation specified by the backup software of the operating system performing the backup function. The information stored in field 36 is selected by the backup software from a set of numbers preassigned to the various then-known operating systems supported by the backup software. It is to be noted that backup sets created with various different operating systems may be archived on the same tape 10. A field 37 is provided for indicating the tape number for backup sets that begin on another tape 10 and a field 38 is provided for indicating that the set is continued on another tape. Backup set directory file 26a additionally includes a field 41 indicating the size of each directory file in the backup set. For reasons that will be set forth in detail below, the size of the directory files is dependent on the operating system that establishes the backup set.

File 26a additionally includes pointer fields 39 and 40 which store pointers to the memory locations in the block allocation table 24 at which the block allocation chains for the backup set directory files 28a and the data files 30a begin. Thus, the data structure of the block allocation table 24 and the backup set directory files 26a provide mapping to the directory files and data files for each file in a given backup set.

Each directory file 28a, which corresponds to one user file in the backup set, includes a field 42 in which the backup software stores the offset from the beginning of the data files that wake up the corresponding backup set at which the data file 30a corresponding to this directory file 28a is located (FIG. 3). Directory file 28a additionally includes a field 43 for storing the date when the corresponding user file was created or last changed. Because the date is in the format of the operating system that creates the user file, and presumably also the backup set, the backup software translates this number to a commonly-used format, such as Unix format. Each directory file 28a additionally includes a field 44 for storing the size of the corresponding data file 30a and a field 45 for storing an attribute word whose individual bits are assigned to designating (1) whether the corresponding data file is a continuation from a previous tape (split file), (2) whether the corresponding data file is continued onto another tape (incomplete file), and (3) whether the corresponding data file is a hidden file.

Each directory file 28a additionally includes a name field 46 in which the "name" assigned to the user file, typically by the user, is stored. Because the "name" may vary in length as a function of the particular operating system which created the user file, and which presumably also performed the backup function, field 46 is of indeterminate length and is null-terminated. The file name stored in field 46 is fully specified, including the path of the file in the directory tree of the disk or other memory device from which the user file is backed up. Directory file fields 42–46 define common fields 48 because they store information pertinent to the corresponding data file 30a that is nonspecific to the operating system backing up, or the operating system that will subsequently be restoring, the corresponding user file. Thus, the information in fields 48 will be retrieved during restoration of the corresponding user file regardless of the operating system performing the restoration.

Each directory file 28a additionally includes an operating system specific field area 49 of indeterminate length. The backup software directs to this field area 49 the portions of a user file which remain after excluding the information of the user file which is data and the information of the user file which is assigned to common fields 48. This would include, for example, control words which determine how a specific operating system processes the data words or access information which determines allowed user access to the data in the file. Because the words stored in field area 49 are specific to the operating system which created the backup set and presumptively also the user file, the content of field area 49 is retrieved only when restoring is being performed by an operating system which is substantially the same as, or compatible with, the operating system that backed up the corresponding user file. The size of each directory file 28a in the backup set, which is stored in field 41 in the corresponding backup set directory file 26a (FIG. 2), is utilized by the restoring software to offset to the next directory file 28a to bypass the field area 49 when the backup set is restored with an operating system different from that performing the backup function.

Data information for each user-created file included in a backup set is stored on medium 10 in a data file 30a (FIG. 4). The date information is written in a conventional format such as Motorola Byte-Ordering and the data files 30a are stored in data blocks 30. While the previously-described system including the block allocation table 24, backup set directory 26, directory blocks 28 and data blocks 30 is sufficient to backup and restore user files using different operating systems and allows restoring of selective files from a backup set, enhanced reliability is provided in the illustrated embodiment by the formatting of a header 50 as a part of each data file 30a stored in data blocks 30. If the corresponding directory file 28a is destroyed or accidentally erased, information stored in the common fields and operating system specific fields is redundantly provided in header 50 to allow the directory file to be reconstructed. The redundant data in header 50 is sufficient to allow reconstruction of the directory file to the extent that restoring of the user file from an operating system different from that which backed up the user file can be performed.

Each header 50 includes a signature string field 52 to store an identification to indicate the start of a header and a header length field 53 to provide offsets to the data area 54 from the beginning of the header. The purpose of providing header lengths information is to allow the software to offset to data field 54 under normal situations when it is unnecessary to read the header. Header 50 further includes field 55 identifying the code of the operating system performing the backup which is identical information to that provided in field 36. An attribute word is stored in field 56 essentially identical to that stored in field 45. A field 57 is provided in which the backup software stores an indication of the size of the data file for use in reconstruction of directory files, as will be set forth in more detail below. The date of creation of the user file, expressed in Unix format, is stored in a field 58 and an identification number for the backup set is stored in a field 59. Header 50 additionally includes a field 60 in which the backup software identifies the version number of the backup software creating the header in order to facilitate forward compatibility of the backup software.

Header 30a additionally includes a field 61 for the "name" assigned to the user file. As previously set forth, the file name has an indeterminate length because it is a function of the operating system performing the backup function. Accordingly, field 61 has an indeterminate size and is null-terminated. The file name stored in field 61 is fully specified, including the path of the file in the directory tree of the disk from which the file is backed up. Header 50 additionally includes a field area 62 in which the backup software stores the same information stored in operating system specific field area 49 of directory area 28a. Because the length of field area 62 is specific to the operating system performing the backup, a field 63 stores an offset value to the name field 61 of file 30a in order to allow the directory file reconstruction software to bypass operating system specific field area 62 and locate field 61. Header 50 additionally includes a field 64 to provide offset into the remainder of file 30a if the file is separated in data blocks 30 of storage medium 10. Field 64 provides the linkage that would normally be performed in the block allocation table. This information is provided in header 50 to allow restoring independently of the block allocation table 24.

II. Backup and Restore Logic a) Backup Function

The backup function 100 is initiated at 102 and includes obtaining from the user, through an input device such as a keyboard, a backup set name, a backup set description and a password. The system additionally prompts the user to identify the user files on the system disk that the user desires to backup to tape 10. The program then proceeds to read (104), and store in a global variable, the contents of tape header 20. The program then proceeds to read and store (106) the components of the block allocation table and read and store (108) the contents of backup set directory 26. The purpose of reading the tape header, block allocation table and backup set directory is to determine the allocated portions of the backup medium and the existing backup sets to ascertain, if necessary, whether the user wishes to overwrite any existing backup sets.

The program proceeds to examine (110) the directory of the hard disk, or other memory store selected by the user from which files are to be backed up, to determine if a file is found on the disk. If so, the program determines at 112 if the located file was selected by the user at 102 for inclusion in the backup set. If not, the program returns to 110 to locate the next file on the disk. If it is determined at 112 that the located file was selected by the user to be included in the backup set, the full file name, including the path to the file in the hard disk directory tree, the date the user file was created or last revised, the file attributes specific to the operating system that established the file and the entire data contents of the user file are retrieved.

The program proceeds to 114 where it is determined whether sufficient space remains in a temporary store, in which directory files are retained during the backup function, to add a directory file for the selected user file. If it is determined at 114 that space is available, the program locks open (116) the temporary store in order to create a directory file 28a and add (118) the directory file to the developing directory tree in the temporary store. The program then proceeds to create (120) a header 50 for the data portion of the selected user file. The corresponding data file 30a including header 50 and data 54 for the selected user file is then written to the tape 10 at 122. The program then returns to 110 for examination of the next file on the hard disk.

If it is determined at 114 that there is insufficient space in the temporary store for the additional directory file associated with the selected user file, the program determines at 116 if this is the first pass through this portion of the routine. If so, the offset in the directory block 28 for the set of directory files in the backup set is calculated (126), and the directory files 28a are written (128) to medium 10 to clear the temporary store. Once the temporary store has been emptied, the program determines at 130 if additional user files have been selected for inclusion in the backup set that have not been written to the tape. If so, the program examines (110) the next file on the hard disk and determines (112) if the located file has been selected by the user for inclusion in the backup set.

When the program determines at 110 that all files on the hard disk have been examined, the program proceeds to 124 to determine whether this is the first pass through this portion of the routine. If so, the offset in the directory block 28 for the set of directory files in the backup set is calculated (126) and the directory files are written (128) to medium 10. If it is determined at 124 that this is not the first pass through this portion of the routine, then the directory offset has been established and control passes to 128 for writing of the additional directory files to the medium.

When it has been determined at 130 that all files selected for inclusion in the backup set have been written to the tape, the block allocation table is prepared/updated and written (132) to block 24. The backup set directory is then prepared/ updated and written (134) to block 26. Finally, the content of the tape header is updated and written (136) to block 20 to complete the backup function and return (138) control to the operating system of the computer system performing the backup function 100.

b) Restore Function

When the restore function 200 is selected by the user at 202, the program opens (204) the file system by reading the contents of the tape header 20, the block allocation table 24 and the backup set directory 26 and stores the contents in a global variable. The function opens (206) a backup set by obtaining from the user the file name of the backup set from which it is desired to restore some or all of the files in the set. The content of the backup set directory file 26a for the selected backup set is retrieved and the pointers in fields 39 and 40 are applied to the block allocation table to determine the locations in the directory blocks 28 and data blocks 30 where the directory files and data files for the selected backup set are located. When this has been completed, the user is prompted to select individual files from the selected backup set to restore and the function retrieves (208) the directory file 28a for the first file in the backup set. The program proceeds to 210 where it will be determined that a file was found because each backup set contains at least one file. The program then determines at 212 whether the retrieved file has been selected by the user for restoring to the hard disk. If not, the function attempts to retrieve (214) the next file in the backup set and, if a file is found (210), it is determined at 210 whether the file has been selected by the user for restoring to the hard disk. If it is determined at 212 that the file is selected, the program proceeds to 216 where it is determined whether space is available in a temporary store allocated for development of a directory tree of selected files. If space is available, the program proceeds to 218 where the content of the directory file corresponding to the selected user file is examined and decoded for inclusion in the directory tree developed in the temporary store.

Figure 7:
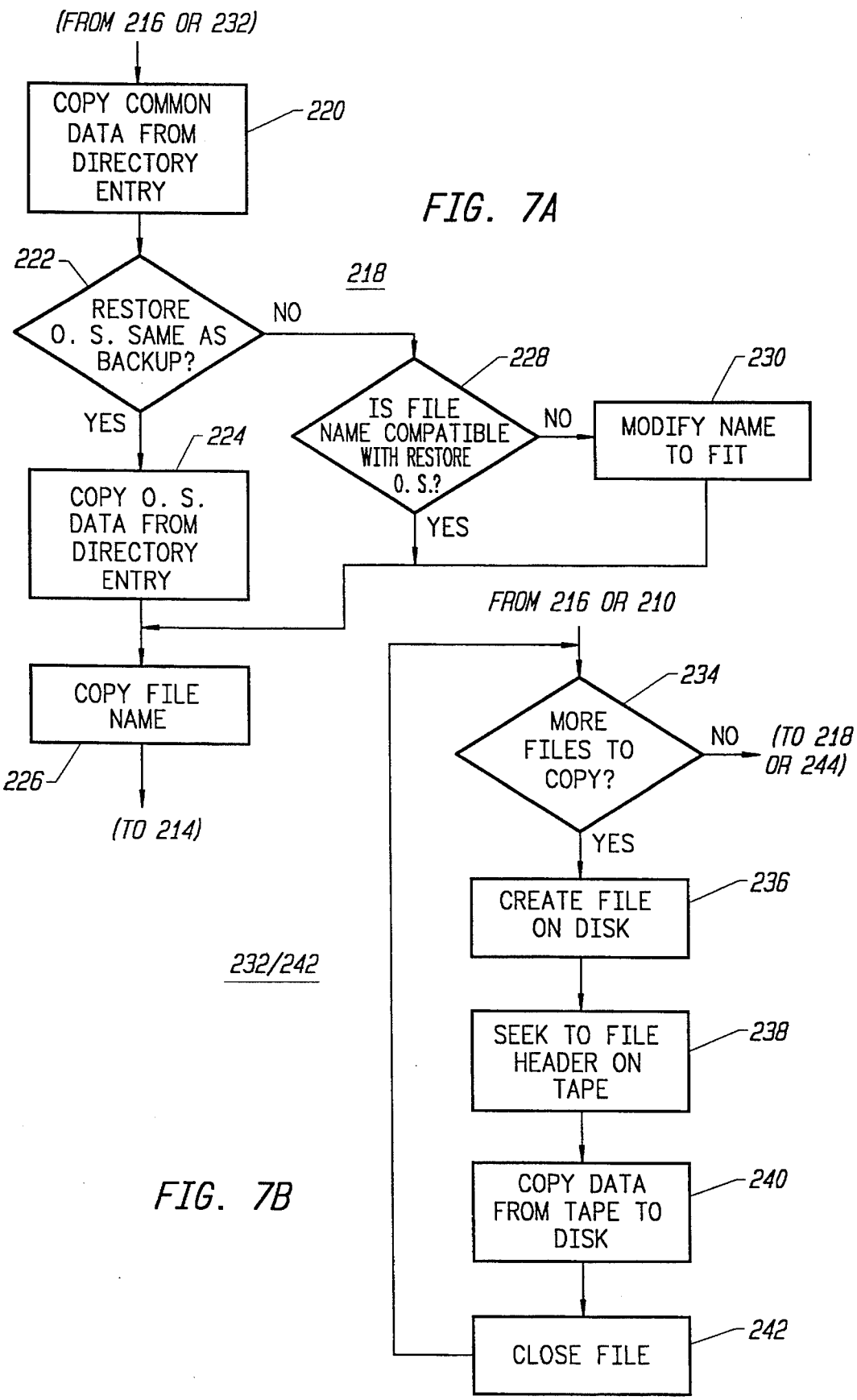

Decoding of the directory file 28a is illustrated in more detail in FIG. 7a. The program copies (220) the information in common fields area 48 and determines at 222, by examining the content of field 36 in the directory file, whether the operating system performing the restore function 200 is the same as that which performed the backup function 100 to establish the selected backup set. If it is determined at 222 that the same operating system created the backup set containing the user file as is presently restoring the user file, the information in all fields of file 28a, including the information in operating system specific field 49, is retrieved and applied to the directory tree. If it is determined at block 222 that the operating system performing the restore function 200 is not the same as that identified in field 36 as the operating system that performed the backup function 100, then the information in operating system specific field 49 is ignored. However, the information in the name field 46 and the information in common fields area 48 is retrieved and it is determined (228) whether the structure of the name information retrieved from the name field is compatible with the operating system performing the restore function 200. A file name is not compatible unless the number of characters in its extension portion, if any, are less than or equal to the number of characters allowed in the extension portion, if any, of the operating system performing the restore function 200 and are all legal characters for the restoring operating system. Likewise, a file name is not compatible unless the number of characters in the primary portion of the file name is less than or equal to the number of characters allowed in the primary portion of the file name in the operating system performing the restore function and are all legal characters. If the name is compatible, the function proceeds to 226 where the file name is included in the directory tree entry. If it is determined at 228 that the file name information retrieved from the name field 46 is not compatible, a conversion algorithm is applied (230) to the file name to make it fit the name specifications of the operating system performing the restore function.

The conversion algorithm applied at 230 examines the primary portion and extension portion of the file name individually and, for each portion, eliminates any characters that are not recognized as valid name characters by the restoring operating system. The spaces are converted to underscores and a determination is made whether the modification to the name is sufficient to allow it to fit the restoring operating system. If not, then the vowels in the name are eliminated and the name is again examined for fit. If it still doesn't fit, the name portion is truncated to the necessary length in order to fit the restoring operating system. The program passes to 226 where the modified name is included in the directory tree entry for the corresponding user file.

Figure 6:
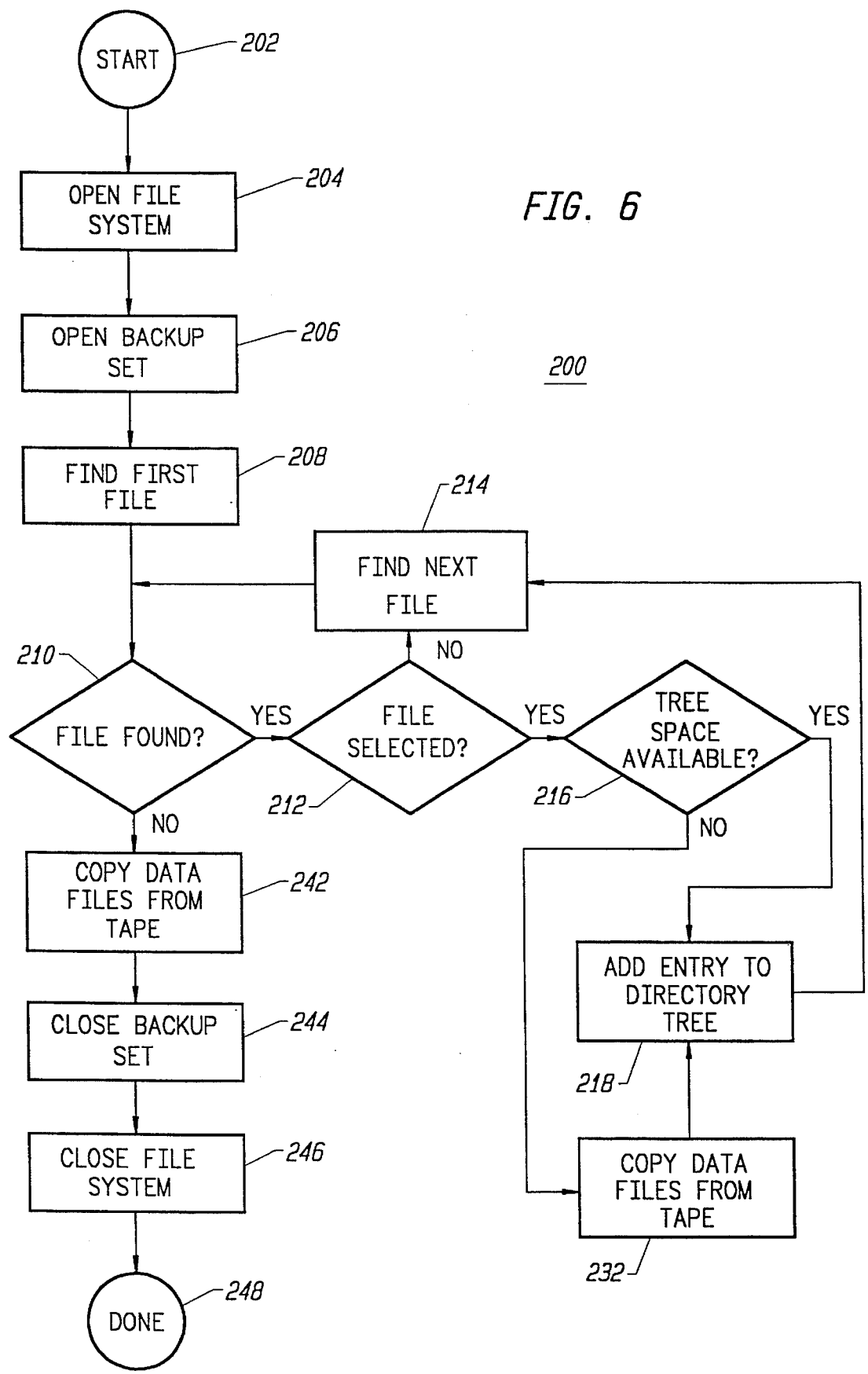
FIGS. 6, 7a and 7b are flow charts of the restore function.

After completion of the directory tree entry for the selected user file, the program proceeds to 214 (FIG. 6) for attempted retrieval of the next file, to 210 to determine if a file has been found and, if found, to 212 to determine if the found file is selected by the user for restoring to the system's disk. If a user file is found and selected, an entry to the directory tree for the file is added at 218 provided it is determined at 216 that sufficient space is available in the temporary store allocated for the directory tree.

As the program for restore function 200 proceeds through blocks 208 to 218, a directory tree of selected user files is developed. However, during this portion of the routine, the data files for the selected user files are not yet retrieved from the tape. Rather, the entire directory tree of files selected by the user for restoring from the selected backup set is first completed such that the actual restoring of the data file portion of the selected user files occurs uninterrupted during a period of exclusive access by function 200 to the system's disk. The purpose is to avoid file modification by another user on a network that may be adding and deleting files to the system's disk.

Under usual circumstances, the temporary store in which the directory tree is developed for restore function 200 will be sufficiently large to develop the full directory tree for the selected files of the selected backup set. However, if it is determined at 216 that the temporary store in which the directory tree is being developed does not have available space for the directory information for the file found at 210 and selected at 212, the program copies (232) the data files corresponding to entries in the directory tree from the tape. The data files are combined with the contents of the directory tree to restore the corresponding user files which are written to the disk or other memory device of the restoring system. As data files are copied, the portion of the directory tree for each file copied to the disk is eliminated to make room in the temporary store.

The copy function 232 is illustrated in detail in FIG. 7b. From block 216, the program determines at 234 that additional files remain to be copied and creates (236) a user file on the hard disk from the information added at 218 to the directory tree for that file. The function then seeks (238) the file header 50 for the corresponding data file 32a from the offset information in field 42 of the corresponding directory file 28a. The data 54 is copied at 240 from medium 10 to the disk by offsetting from the beginning of the header according to the header length information in field 53. The corresponding data file is closed at 242 and the function returns to 234 to determine if additional data files remain to be copied. If not, then the "copy files" routine 232 is exited. After the data files corresponding to the entries of the directory tree are copied to the disk and the entries of the directory tree are eliminated, the temporary store in which the directory tree is built will be available for additional entries.

After the last file selected for restoration is retrieved, it will be determined at 210 that no additional files are found. The program proceeds to block 242 for copying from medium 10 the files in the directory tree in the same manner previously described at block 232 and as illustrated in FIG. 7b. After the data files are copied from the medium to the system's disk, the backup set is closed at 244 by eliminating or revising the file 26a in the backup set directory for the selected backup set and the system is closed at 246 by repeating the functions performed at blocks 132–136 to update the block allocation table, the backup set directory and the tape header. The function is exited at 248.

III. Tape Reconstruction

Figure 8:
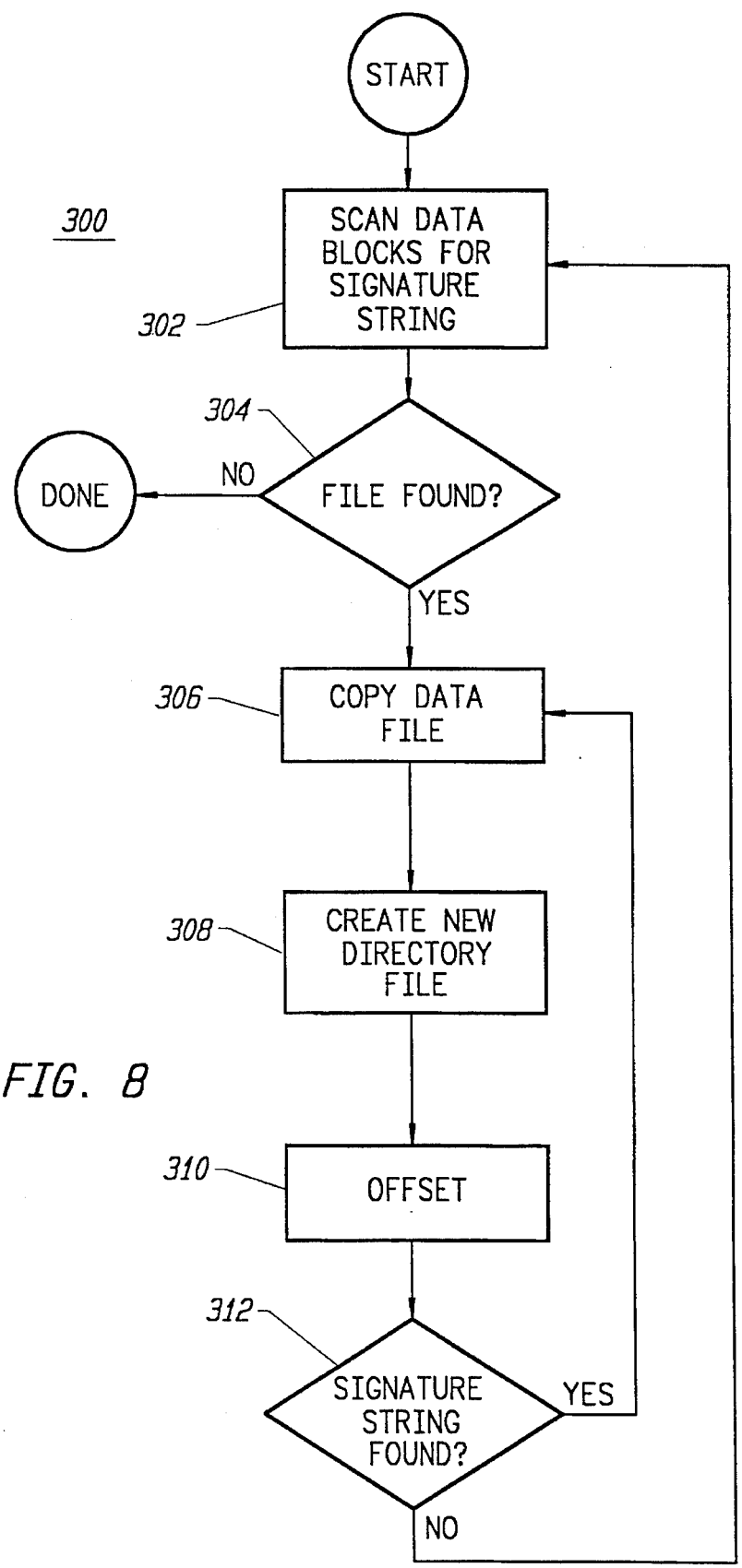
FIG. 8 is a flow chart of the reconstruction function.

If, at any time during the restore function 200, the system cannot successfully retrieve a directory file from directory blocks 28, an error message is provided to the user. A reconstruction function 300 may then be performed to reconstruct the defective directory file (FIG. 8). When function 300 is invoked, the beginning sector of each data block 30 is sequentially examined (302) for identification of a valid signature string as stored in field 52. When a valid signature string is identified (304), then the entire data file 30a, including header 50 and data 54 is retrieved (306) and is used by the reconstruction function to develop (308) a directory file 28a. The directory file is reconstructed from information in header 50 and may be formatted to a directory block 28 of a new medium 10. The program then offsets (310) to the end of the located file on the basis of the file size information stored in field 57 of header 50 and determines (312) whether a valid signature string, indicating the beginning of the next data file, has been located. If so, the program returns to 306 to retrieve the next data file 30a. If a valid signature string is not located (312) then the program returns to 302 and begins block-by-block scanning until the identification of the signature string indicates another data file has been located.

In this manner, the entire directory area of a tape may be reconstructed and combined with the surviving data files on a new tape. In the preferred embodiment, reconstruction routine 300 is conducted at the software vendor because of the infrequences of its use. However, reconstruction routine 300 could alternatively be supplied as a function adjunct to the backup and restore routines (100, 200) for use by the software user from prompts provided with the reconstruction routine.

By providing the capability of restoring files from a tape written with a different operating system, the present invention most advantageously ensures both forward and backward compatibility. Not only is it possible to archive user files to be retrieved at some future data by a yet undeveloped operating system, the present invention provides a substantial advantage in not requiring the re-release of existing backup/restore software systems when a new operating system is supported. A tape written by a subsequently-added operating system can be restored from an earlier version of the backup software.

Although the invention may be utilized on any form of mass storage medium, the serpentine format of a multi-track tape is advantageously used in a preferred embodiment. The first and second tracks are assigned to the header block 20, defect management block 22, BAT block 24, backup set directory block 26 and the directory blocks 28. The third and subsequent tracks are assigned to data blocks. In this manner, during a backup routine, the tape head indexes past the first two tracks easily and quickly by a lateral shift in order to begin writing the data files while the tree of directory files is being developed in a temporary store. After the data files are stored, the head is returned to the first two tracks for writing the remaining directory-related areas. This elimination of sequential scanning through the tape reduces the time required to perform a backup routine significantly.

In the preferred embodiment, the invention is implemented in the "C" programming language and all information is stored in Motorola Byte-Ordering format. However, it is capable of implementation by other languages and formats by those skilled in the art. Other changes and modifications in the specifically described embodiment can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of operating computer systems including utilizing a storing computer system operating with a first particular operating system to store a data file on a storage medium such that said data file can be recovered by a user from said storage medium utilizing a retrieving computer system operating with a second particular operating system, said method including the steps of:

storing operating system identification information on said storage medium using said storing computer system, said operating system identification information identifying said first particular operating system;

creating a directory file in said storing computer system for said data file and said storage medium, said directory file including first and second fields; and storing data file information from the storing computer system on said storage medium using the storing computer system, said step of storing data file information including storing data file location information that is nonspecific to said first particular operating system in one of said fields, and storing data file location information that is specific to said first particular operating system in the other one of said fields and storing said data file at a location identified by said data file location information, wherein the retrieving computer system determines whether the second particular operating system is compatible with the first particular operating system to recover the data in said data file at said location identified by said file location information, using said file location information that is nonspecific to said first particular operating system in one of said fields when the second operating system is not compatible with the first operating system.

2. A method of operating computer systems including utilizing a storing computer system operating with a first particular operating system to store a data file on a storage medium such that said data file can be recovered from said storage medium by a retrieving computer system operating with a second particular operating system, said method including the steps of:

storing operating system identification information on said storage medium using said storing computer system, said operating system identification information identifying said first particular operating system;

creating a directory in said storing computer system for said file and said storage medium, said directory including first and second fields;

storing data file information from the storing computer system on said storage medium using the storing computer system, said step of storing data file information including storing data file information that is nonspecific to said first particular operating system in one of said fields and storing data file information that is specific to said first particular operating system in the other one of said fields;

examining said operating system identification information stored on said storage medium in the retrieving computer system, identifying said first particular operating system from said operating system identification information, determining if said second particular operating system is compatible with said first particular operating system identified by said operating system identification information;

retrieving said data file information in said one of said fields into the retrieving computer system using said second particular operating system only if said second particular operating system is not compatible with said first particular operating system; and retrieving into the retrieving computer system said data file information in said one of said fields and said data file information in said other of said fields if said second particular operating system is compatible with the operating system identified by said operating system identification information.

3. The method as defined in claim 2 in which said step of retrieving said data file information in said one of said fields further includes determining in said retrieving computer system that said data file information in said one of said fields is compatible with said second particular operating system.

4. The method as defined in claim 3 in which said step of determining includes determining whether said data file information in said one of said fields is compatible with the said second particular operating system of the retrieving computer system and converting in said retrieving computer system said Data file information in said one of said fields to a form that is compatible with said second particular operating system if it is determined that said data file information in said one of said fields is not compatible with said second particular operating system.

5. The method as defined in claim 4 in which said data file information that is nonspecific to said first particular operating system includes a name assigned in said storing computer system to said file.

6. The method as defined in claim 1 in which said file information that is nonspecific to said first particular operating system includes a name assigned in said storing computer system to said file.

7. The method as defined in claim 6 in which said file information that is nonspecific to said first particular operating system includes the date said file was last modified.

8. The method as defined in claim 7 in which said file information that is specific to said first particular operating system includes control information for controlling the manner in which an operating system utilizes data in said file.

9. The method as defined in claim 1 in which said file information that is specific to said first particular operating system includes control information for controlling the manner in which an operating system utilizes data in said file.

10. The method as defined in claim 2 further including the steps of creating a data file for said file on said storage medium including a file header having third and fourth fields and storing data file information that is nonspecific to said first particular operating system in one of said third and fourth fields and storing information that is specific to said first particular operating system in the other one of said third and fourth fields, and wherein said retrieving computer system retrieves only said data file information in the one of said third and fourth fields if said second particular operating system is not compatible with said first particular operating system.

11. The method as defined in claim 10 further including the step of retrieving said data file information in said third and fourth fields and reconstructing in said retrieving computer system said directory from said data file information in said third and fourth fields.

12. The method as defined in claim 10 further including the step of storing data in said data file after said file header and wherein said file header has a fifth field including the size of said header to allow a retrieving computer system to bypass said header to access said data in said data file.

13. A method of operating computer systems including utilizing a storing computer system to store user-created files from a memory device of the storing computer system on a storage medium such that said files are recovered from said storage medium using a retrieving computer system, said storing computer system utilizing a first particular operating system and said retrieving computer system utilizing a second particular operating system, said method including the steps:

(a) locating a user-created file on said storing computer memory device in said storing computer system;

(b) creating a directory file, using said storing computer system, for said user-created file and said storage medium, said directory including first and second fields;

(c) storing data file location information that is nonspecific to said first particular operating system in one of said fields using the storing computer system and storing data file information that is specific to said first particular operating system in the other of said fields using said storing computer system;

(d) creating a data file for data in said user-created file and storing said data file on said storage medium, at the location identified by said data file location information, using said storing computer system;

(e) repeating (a) through (d) for the next user-created file on said storing computer memory device; and (f) storing on said storage medium information identifying said first particular operating system using said storing computer system; and (g) recovering the data file at the file location identified by information stored in said first field with the retrieving computer system, when the second operating system is not compatible with the first particular system, wherein the data file is recovered using an operating system which is not compatible with the first particular operating system.

14. The method as defined in claim 13 further including (g) storing the directory files on said storage medium using said storing computer system.

15. The method as defined in claim 14 wherein said step (d) includes storing said data file in a first predetermined portion of said storage medium using said storing computer system and said step (f) includes storing the directory files in a second predetermined portion of said storage medium using said storing computer system, said second predetermined portion separated from said first predetermined portion.

16. The method as defined in claim 14 wherein said step (d) includes providing a header in said storage medium having third and fourth fields for each said data file and storing said file information that is nonspecific to said first particular operating system in one of said third and fourth fields and said data file information pertaining to the file that is specific to the particular operating system of the storing computer system in the other of said third and fourth fields.

17. The method as defined in claim 14 further including:

(h) examining said data file information stored on said medium identifying said first particular operating system using the retrieving computer system, and determining in the retrieving computer system if the particular operating system of the retrieving computer system is compatible with said first particular operating system identified in said directory file;

(i) retrieving one of said fields from said storage medium using said retrieving computer system if said second particular operating system is not compatible with said first particular operating system or retrieving said other of said fields from said storage medium using said retrieving computer system if said second particular operating system is compatible with said first particular operating system;

(j) adding said data file information in said one of said fields to a temporary store in said storing computer system; and (k) adding said data file information in said other of said fields to said temporary store if said second particular operating system is compatible with said operating system identified in said directory.

18. The method as defined in claim 17 further including (l) repeating steps (i) through (k) for all files selected by a user for recovery by the retrieval computer system;

(m) retrieving the data files using said retrieving computer system for all files selected by a user; and (n) writing said data files and the information in said temporary store pertaining to said data files to a memory device of said retrieving computer system.

19. The method as defined in claim 17 in which step (j) includes determining in the retrieving computer system whether said information in said one of said fields is compatible with said second particular operating system.

20. The method as defined in claim 17 in which step (j) includes determining whether said information in said one of said fields is compatible with said second particular operating system and converting said information in said one of said fields to a form that is compatible with said second particular operating system if it is determined that said information in said one of said fields is not compatible with said second particular operating system.

21. A method of operating computer systems including utilizing a storing computer system to store a set of user-created files from a memory device of said storing computer system on a magnetic tape such that it is recovered using a restoring computer system, said storing computer system utilizing a first particular operating system and said restoring computer system utilizing a second particular operating system, said method including the steps of:

(a) locating, using the storing computer system, at least one user-created file in said memory device;

(b) creating in the storing computer system at least one directory file for said user-created file and storing file information for said at least one user-created file in said directory file;

(c) creating a data file for data in said at least one user-created file, using the storing computer system, and storing said information pertaining to said at least one user created file in a portion of said data file;

(d) storing said data file on said magnetic tape using said storing computer system;

(e) repeating steps (a) through (d) for all files selected by a user for storing as a set of files;

(f) storing in said directory files, using said storing computer system, information sufficient to determine the location of the corresponding data file on said magnetic tape;

(g) storing said directory files on said magnetic tape using said storing computer system;

(h) creating a set directory file in said storing computer system for said set of files and storing in said set directory file information pertaining to the location on said magnetic tape of the corresponding directory files; and (i) storing said set directory file on said magnetic tape using said storing computer system wherein a computer system using said second particular operating system recovers said data file using said file location information when said second particular operating system is not compatible with said first particular operating system.

22. The method as defined in claim 21 further including (j) selectively restoring designated ones of said files from said set of files using the restoring computer system.

23. The method as defined in claim 22 wherein said step (j) includes retrieving said set directory file from said magnetic tape using the restoring computer system, determining in the restoring computer system the location on said magnetic tape of said directory files from the information in said set directory file, locating said directory files, determining in the restoring computer system which of said directory files are selected for restoring, determining from the information in said selected directory files the location on said magnetic tape of the corresponding data files and retrieving said corresponding data files from said magnetic tape using the restoring computer system.

24. The method as defined in claim 21 wherein said step (b) includes storing file information that is nonspecific to the particular operating system of the storing computer system in a first field in said directory using the storing computer system and storing file information that is specific to the particular operating system of the storing computer system in a second field in said directory using the storing computer system and wherein said step (h) includes storing information identifying the particular operating system of the storing computer system in said set directory file.

25. The method as defined in claim 24 further including (j) selectively restoring designated ones of said files from said set of files using the restoring computer system.

26. The method as defined in claim 25 wherein said step (j) includes retrieving said set directory file from said magnetic tape using the restoring computer system, determining from the information in said set directory file and the location on said magnetic tape of said directory files and whether said second particular operating system is compatible with said first particular operating system identified in said set directory file, locating said directory files, determining in the restoring computer system which of said directory files are selected for restoring, determining from the information in said selected directory files the location on said magnetic tape of the corresponding data files, retrieving said information in said first fields of said directory files using the second particular operating system if said second particular operating system is not compatible with said first particular operating system and retrieving said information in said first fields of said directory files using said second particular operating system if said first and second operating systems are compatible, retrieving said information in said second fields of said directory files only if said second particular operating system is compatible with said first particular operating system identified in said set directory file, determining in the restoring computer system from the information in said selected directory files the location on said magnetic tape of the corresponding data files, and retrieving said corresponding data files from said magnetic tape if said first and second particular operating systems are compatible and if said first and second particular operating system are not compatible.

27. A storage system for storing user-created files on a storage medium from a storing computer system operating with a first operating system software and for restoring said files to a retrieving computer system operating with a second operating system software, said storage system comprising;

means in the storing computer system for formatting data information in a user-created file for writing in a data file and writing said data file at a location on a storage medium;

means in the storing computer system for formatting for and writing to a first portion of a directory file information identifying the name of a user-created file and the location on said medium of the corresponding data file;

means in the storing computer system for formatting for and writing to a second portion of said directory file information from a user-created file which determines in part the manner in which said first operating system processes data information in user-created files;

means for writing directory files at a location on a storage medium;

means in the storing computer system for formatting for and writing to in a set directory file the identity of said first operating system and the location on said medium of the directory files for a set of user-created files and for storing the identity of said first operating system on said medium;

means in the retrieving computer system for retrieving set directory files and for determining from said set directory files the location of directory files for the set including determining means for determining whether the set was stored from a computer system utilizing said second operating system;

means in the retrieving computer system for retrieving directory files and for determining from said first portion of the directory file the location on said medium of the corresponding data file;

means in the retrieving computer system for identifying the second particular operating system and retrieving data files using the second particular system if said first and second particular operating systems are not compatible and for retrieving data files using the second particular operating system if said first and second particular operating system are compatible; and combining means responsive to said determining means for combining data information in a retrieved data file with the name information in the corresponding directory file and for combining said data and name information with said information in said second portion of the corresponding said directory file if the set was stored by a computer system utilizing said second operating system.

28. The storage system in claim 27 wherein said combining means includes means for determining whether the format of the retrieved name is compatible with the second operating system.

29. The storage system in claim 28 wherein said determining means includes means for converting an incompatible name to a name that is compatible with the second operating system.

30. The storage system in claim 27 wherein data information formatting means in the storing computer system includes means for establishing a header portion in a data file and header formatting means for formatting to said header portion the name of a user-created file and information from a user-created file that determines in part the manner in which said first operating system processes data information in user-created files.

31. The storage system in claim 30 wherein said header formatting means in the storing computer system includes means for formatting a code identifying a file as a data file.

32. The storage system in claim 31 wherein said header formatting means in the storing computer system includes means for formatting the length of the header and the length of the files for the corresponding data file.

33. A method of operating a computer system to recover a file which has been retrieved from a storage medium by a different computer having a second and different operating system, said computer system having only a first operating system, said file including information specific to said second operating system, information non-specific to the second operating system and information which identifies said method including the steps of:

examining said file to identify the second operating system;

determining if the second operating system is compatible with said first operating system;

retrieving said file if the second operating system is compatible with said first operating system; and retrieving only said information which is not specific to the second operating system if said first operating system is not compatible with said second operating system.

* * * * *